United States Patent [19]

Sigwald et al.

[11] 4,408,451

[45] Oct. 11, 1983

[54] ROTATING JOINT FOR AN EXHAUST PIPE OF AN AUTOMOBILE VEHICLE

[75] Inventors: Jacques Sigwald, Frepillon; Claude Lesueur, Argenteuil, both of France

[73] Assignees: Automobiles Peugeot; Automobiles Citroen, both of France

[21] Appl. No.: 398,342

[22] Filed: Jul. 15, 1982

[30] Foreign Application Priority Data

Jul. 29, 1981 [FR] France .................... 81 14729

[51] Int. Cl.³ .................................................. F01N 7/00
[52] U.S. Cl. ........................................ 60/322; 285/198; 285/281; 285/364
[58] Field of Search .................. 60/322; 285/198, 281, 285/282, 364

[56] References Cited

U.S. PATENT DOCUMENTS

| 1,542,335 | 6/1925 | Cardarelli | 285/281 |
| 3,240,392 | 3/1966 | Nicko | 285/364 |
| 3,922,010 | 11/1975 | Alf | 285/282 |
| 4,182,121 | 1/1980 | Hall | 60/322 |
| 4,223,922 | 9/1980 | Pape | 285/364 |

FOREIGN PATENT DOCUMENTS 800398 1/1981 U.S.S.R. .................... 60/322

*Primary Examiner*—Douglas Hart
*Attorney, Agent, or Firm*—Burns, Doane, Swecker & Mathis

[57] ABSTRACT

This rotating joint (7) has an axis (Y—Y) parallel to the axis of the pivotable mounting of the engine. The joint comprises two annular planar surfaces (18, 19) having the same axis (Y—Y) and respectively rigid with the two elements of the exhaust pipe (6, 9) to be interconnected. These surfaces are separated by a heat-resistant anti-friction ring (20) and are biased toward each other by a pivotal U-shaped element (21). Application in vehicles having a transverse front engine.

7 Claims, 3 Drawing Figures

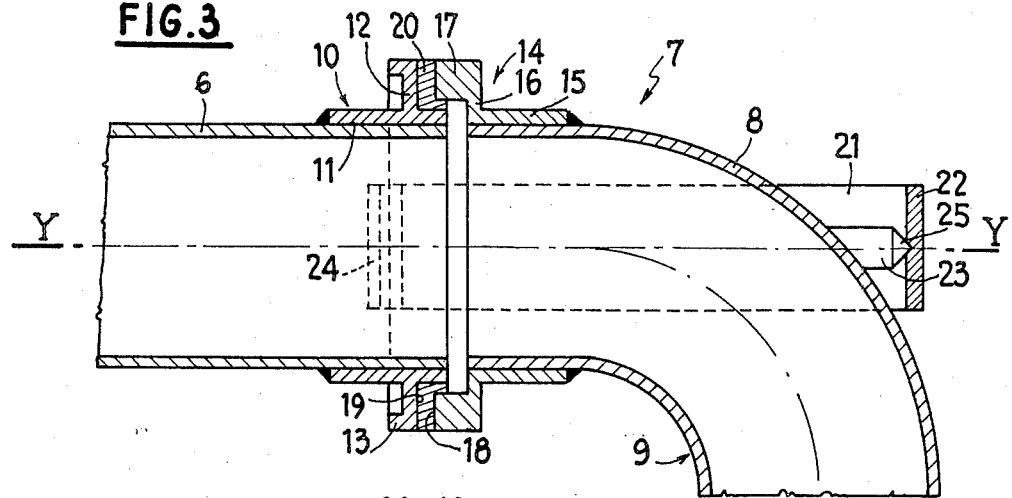
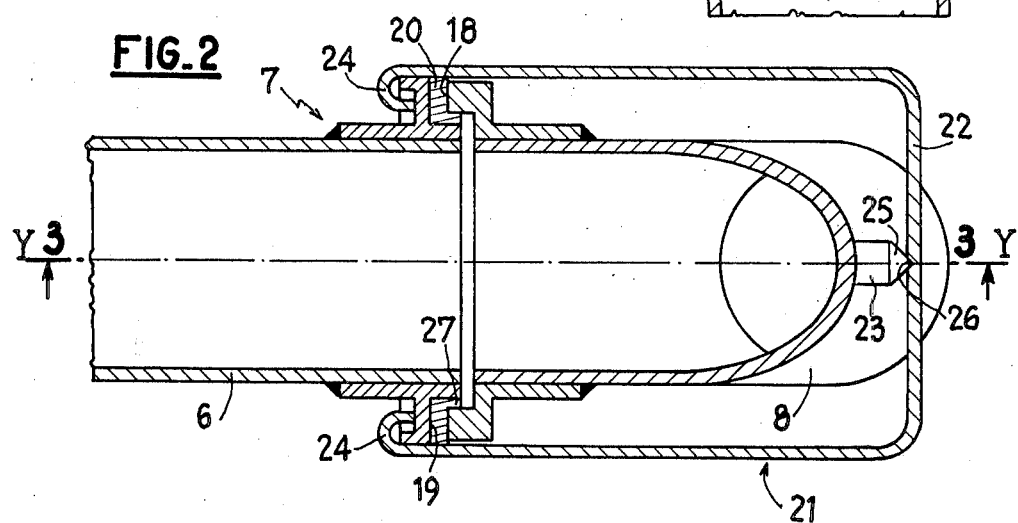
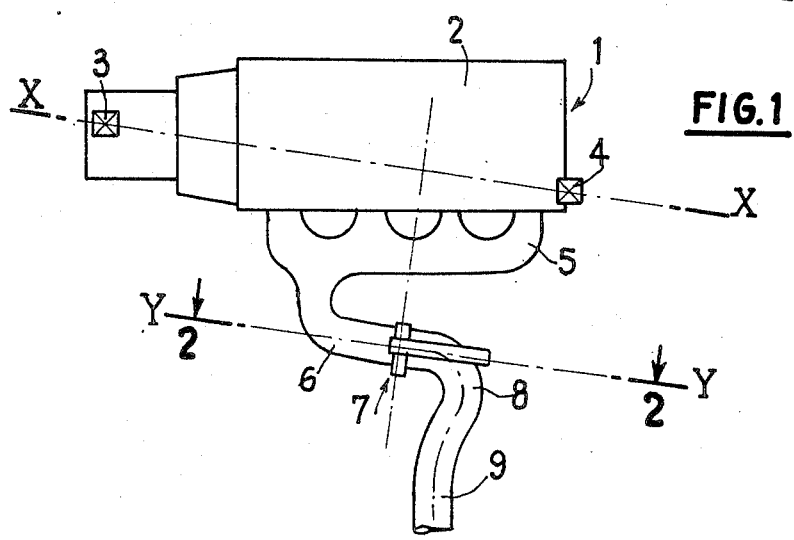

ROTATING JOINT FOR AN EXHAUST PIPE OF AN AUTOMOBILE VEHICLE

DESCRIPTION

The present invention relates to rotating joints for connecting two elements of an exhaust pipe on an automobile vehicle.

On an automobile vehicle having an internal combustion engine placed at the front end, the exhaust pipe or line, which extends substantially throughout the length of the vehicle, to a large part contributes to the creation of an impression of discomfort on the part of the passengers, mainly when the engine operates at low speed, as a result of vibrations to which the exhaust pipe is subjected. Further, sudden changes in the driving torque produce angular movements of the engine which have a repercussion on the exhaust line. These vibrations and these angular movements produce large fatigue stresses in the exhaust line and may even break the latter.

These drawbacks, which are particularly marked when the engine is disposed transversely, are rendered more serious by the adoption of very flexible suspensions which allow a certain angular movement of the engine, while the exhaust line, which is of great length, cannot accept such large angular movements.

For the purpose of reducing the vibrations of the exhaust line, it is current practice to interpose a joint which allows an angular movement between an upstream section of the exhaust pipe connected to the engine and the main section located on the downstream side.

Conventionally, this joint is a ball joint and it has been found that this type of joint has in use the following drawback: It always comprises at least one part of a rubbing surface which is not constantly in contact with the conjugate surface and is in contact with the air of the atmosphere or the exhaust gases so that, when the vehicle is inactive for a prolonged period, this part of the surface becomes oxidized and this results in a defect in the operation of the ball joint when it is put back into service.

An object of the invention is to overcome this drawback by the use of a joint in which the rubbing surfaces always remain in contact throughout their extent.

The invention therefore provides a rotating joint connecting two elements of an exhaust pipe of an internal combustion engine of an automobile vehicle, said joint comprising two confronting planar rubbing surfaces formed on two coaxial rings, each of which is rigid with a respective one of the two pipe elements, the plane of said surfaces being perpendicular to the axis of the pivotable mounting of the engine on its suspension, and means for biasing said two surfaces toward each other.

In a simple and reliable embodiment, a ring which has a low coefficient of friction and is heat resistant is interposed between the two planar surfaces and each planar surface pertains to a flange welded on the corresponding element of the exhaust pipe.

The means for biasing the two planar surfaces toward each other may in particular comprise a U-shaped element which has branches which hook behind one planar surface and a web which bears against the element of the exhaust pipe rigid with the other planar surface.

An embodiment will now be described in the ensuing description with reference to the accompanying drawing in which:

FIG. 1 is a diagrammatic plan view of an engine and of a part of its exhaust line, the latter being provided with a joint according to the invention;

FIG. 2 is a sectional view of the joint, to an enlarged scale, taken on line 2—2 of FIG. 1, and FIG. 3 is a sectional view of the joint taken on line 3—3 of FIG. 2.

FIG. 1 shows an engine-drive unit 1 which is disposed transversely in the front part of an automobile vehicle and comprises an internal combustion engine 2 associated with a gear box and a differential. This unit is suspended on the structure of the vehicle by two elastically yieldable supports 3 and 4, which define an axis X—X about which the unit 1 is pivotable.

The exhaust gases from the engine are discharged by way of a manifold 5 which is rigid with a bent first element or section 6 of the exhaust pipe. This first section is connected by a rotating joint 7 to a bent part 8 of a second element or section 9 of the exhaust pipe. The latter extends to the rear of the vehicle. The first section 6 and the bent part 8 of the second section have, in the region of the joint, a common axis Y—Y which is parallel to the pivot axis X—X of the unit 1.

The joint 7 interconnecting the two sections is shown in more detail in FIGS. 2 and 3. Welded on the downstream end portion of the first section 6, relative to the direction of flow of the exhaust gases, is a flange 10 comprising a sleeve 11 mounted on the section 6 and welded to the latter by its upstream end. The downstream end edges of the section 6 and the sleeve 11 are substantially contained in the same plane. At an intermediate point, the sleeve 11 carries a radial flange 12 which terminates in an annular rim 13 extending in the upstream direction.

Likewise, the upstream end of the section 9 carries a flange 14 which comprises a sleeve 15 which is mounted on this section and is welded to the latter by its downstream end. Projecting from the upstream end of the sleeve 15, which is flush with the end of the section 9, is a radial flange 16 which carries a thick peripheral rim 17 which extends in the upstream direction.

In the position of use, the rim 17 is mounted with a radial clearance on the downstream portion of the sleeve 11 and its upstream face 18 is located at a short distance from the downstream face of the flange 12 in the downstream direction. These two faces 18 and 19 are planar and perpendicular to the axis Y—Y.

There is thus provided between the flanges 10 and 14 an annular space having an L-shaped half section which is filled with a ring 20 which is of the same shape and made from a heat-resistant material which has a low coefficient of friction, for example, sintered metal containing graphite.

A resiliently-yieldable U-shaped element 21 bears by the middle portion of its web 22 against a stud or pin 23 which is fixed on the bent part 8 of the second section 9 and has at the end of its branches hooks which hook behind the rim 13 of the flange 10 of the first section so as to maintain the faces 18 and 19 clamped against the ring 20. The stud 23 is centered on the axis Y—Y and terminates in a point 25 which is engaged in a cavity 26 in the web of the U-shaped element so as to allow the latter to pivot freely about the axis Y—Y.

The joint 7 which has just been described permits an angular movement about the axis Y—Y between the first section 6 and the bent portion 8 of the second section when the engine pivots about the axis X—X.

In the course of this movement, the rubbing surfaces constantly remain in contact with each other and no part of these surfaces can come into contact with the atmosphere or the exhaust gases so that the drawbacks previously encountered in ball joints are avoided. The axial portion 27 of the ring 20 achieves with little friction the relative centering between the two flanges 10 and 14 and consequently between the elements 6 and 9 of the exhaust pipe.

It will be understood that the arrangements described hereinbefore remain applicable if, with the resiliently-yieldable supports 3 and 4 located at different levels, the axis X—X is not horizontal. Further, by way of a modification, the ring 20 may be replaced by a suitable treatment of one and/or the other of the faces 18 and 19 and, if desired, of the cylindrical surfaces centering the two flanges.

Having now described our invention what we claim as new and desire to secure by Letters Patent is:

1. A rotating joint in combination with two pipe elements of an exhaust pipe, and an internal combustion engine of an automobile vehicle connected to the exhaust pipe, said engine being mounted on suspension means to be pivotable about an axis, said joint comprising two coaxial rings, each ring being rigid with a respective one of the two pipe elements, each ring defining a rubbing surface contained in a plane perpendicular to said axis, and means for biasing said two surfaces toward each other.

2. A rotating joint according to claim 1, comprising a heat resistant ring having a low coefficient of friction interposed between the two planar surfaces.

3. A rotating joint according to claim 1, wherein each planar surface is defined by a flange on the respective ring, which ring is welded to the respective pipe element.

4. A rotating joint according to claim 1, 2 or 3, comprising means for relatively centering the two planar surfaces.

5. A rotating joint according to claim 2, comprising means for relatively centering the two planar surfaces, the heat resistant ring having a cylindrical flange interposed between two cylindrical surfaces which are adjacent to the two planar surfaces and are respectively rigid with the two planar surfaces.

6. A rotating joint according to claim 1 or 2, wherein the biasing means comprise a U-shaped element having two branches and a web portion interconnecting the branches, the branches being in hooking relation to a side of one of said rings defining a rubbing surface which is remote from the respective rubbing surface, and said web being in bearing relation to that pipe element which is rigid with the other of said two rings defining rubbing surfaces.

7. A rotating joint according to claim 6, wherein the web of the U-shaped element has a cavity in a mid-portion of the web and a pointed member rigid with the corresponding pipe element is engaged in said cavity.

* * * * *